United States Patent
Du et al.

(10) Patent No.: US 10,984,227 B1
(45) Date of Patent: Apr. 20, 2021

(54) ELECTRONIC DEVICE AND METHOD FOR ANALYZING RESPONSES TO QUESTIONNAIRES

(71) Applicant: HONGFUJIN PRECISION ELECTRONICS(TIANJIN)CO., LTD., Tianjin (CN)

(72) Inventors: Ting-Yu Du, New Taipei (TW); Po-Cheng Chen, New Taipei (TW); Shih-Yin Tseng, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 0 days.

(21) Appl. No.: 16/668,051

(22) Filed: Oct. 30, 2019

(30) Foreign Application Priority Data

Sep. 29, 2019 (CN) .......................... 201910930335.6

(51) Int. Cl.
*G06K 9/00* (2006.01)

(52) U.S. Cl.
CPC ..... *G06K 9/00335* (2013.01); *G06K 9/00288* (2013.01); *G06K 9/00624* (2013.01)

(58) Field of Classification Search
CPC ........... G06K 9/00335; G06K 9/00288; G06K 9/00624
See application file for complete search history.

(56) References Cited

U.S. PATENT DOCUMENTS

| | | | | |
|---|---|---|---|---|
| 6,024,577 | A * | 2/2000 | Wadahama | G09B 5/14 434/322 |
| 10,891,873 | B2 | 1/2021 | Fu et al. | |
| 2013/0216990 | A1* | 8/2013 | Chu | G09B 5/065 434/247 |
| 2013/0226674 | A1* | 8/2013 | Field | G06Q 10/0639 705/7.38 |
| 2018/0285997 | A1* | 10/2018 | Bostick | G09B 9/00 |
| 2020/0034607 | A1* | 1/2020 | Tsai | G06K 9/00335 |
| 2020/0126444 | A1* | 4/2020 | Fu | G09B 19/00 |
| 2020/0175264 | A1* | 6/2020 | Wang | G06N 3/084 |

FOREIGN PATENT DOCUMENTS

| | | | |
|---|---|---|---|
| CN | 107292271 | A | 10/2017 |
| CN | 107358555 | A * | 11/2017 |
| CN | 109859078 | A * | 6/2019 |

OTHER PUBLICATIONS

Translated Version of CN107358555A (Year: 2017).*

(Continued)

*Primary Examiner* — Carol Wang
(74) *Attorney, Agent, or Firm* — ScienBiziP, P.C.

(57) ABSTRACT

A method for analyzing validity of responses to a questionnaire by students identifies each student in classroom images, and analyzes the defined classroom behaviors of each student over a period of time. The classroom behaviors can include learning behaviors and non-learning behaviors. The method determines whether the non-learning behaviors of each student meet (ie. are less than) or exceed (ie. are more than) one or more preset conditions and accordingly screens the questionnaire responses as being valid or not valid. An electronic device and a storage medium for performing the above-described method are also disclosed.

20 Claims, 3 Drawing Sheets

(56) References Cited

OTHER PUBLICATIONS

Translated Version of CN109859078A (Year: 2019).*
Baker, Ryan Shaun, Albert T. Corbett, Kenneth R. Koedinger, and Angela Z. Wagner. "Off-task behavior in the cognitive tutor classroom: when students "game the system"." In Proceedings of the SIGCHI conference on Human factors in computing systems, pp. 383-390. 2004. (Year: 2004).*

* cited by examiner

US 10,984,227 B1

ELECTRONIC DEVICE AND METHOD FOR ANALYZING RESPONSES TO QUESTIONNAIRES

FIELD

The subject matter herein generally relates to information-gathering and psychology.

BACKGROUND

Some responses to questions in a questionnaire may not be trustworthy. For example, for the question "Do you like the teacher of the XXX course", the student may respond favorably because of public psychology, even if the student may be bored by the course. If the responses to such questionnaire are used as a sample, accurate results of such survey may not be achieved.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
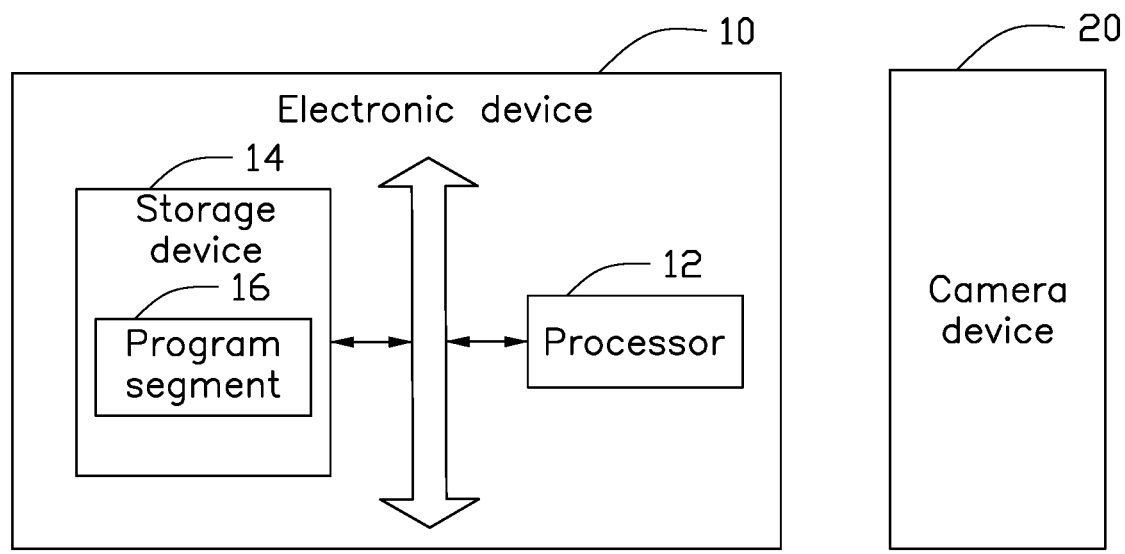
FIG. 1 is a block diagram of an embodiment of an electronic device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates an electronic device 10 in accordance with an embodiment of the present disclosure.

The electronic device 10 can communicate with a camera device 20. The electronic device 10 receives a classroom image of a student acquired by the camera device 20.

The electronic device 10 can further include, but is not limited to, at least one processor 12, a storage device 14, and a program segment 16 stored in the storage device 14. The processor 12 may execute the program code of program segment 16 to implement steps 301-308 in method shown in FIG. 3. The processor 12 may execute the program code of program segment 16 to implement the functions of a system 30 for analyzing responses to questionnaires shown in FIG. 2.

In one embodiment, the electronic device 10 may be a computing device, such as a personal computer or a server. In one embodiment, the server may be a single server, a server cluster, or a cloud server. The block diagram merely shows an example of the electronic device 10 and does not constitute a limitation to the electronic device 10. More or less components than those illustrated may be included, or some components may be combined, or different components used. For example, the electronic device 10 may also include input and output devices, a network access devices, a bus, and the like.

The processor 12 may be a central processing unit (CPU), or may be another general purpose processor, a digital signal processor (DSP), an application specific integrated circuit (ASIC), a field-Programmable gate array (FPGA) or other programmable logic device, a transistor logic device, a discrete hardware component. The general purpose processor may be a microprocessor. The processor 12 may also be any conventional processor. The processor 12 is a control center of the electronic device 10. The processor 12 connects the parts of electronic device 10 by using various interfaces and lines.

The storage device 14 can be used to store the program segment 16. The processor 12 operates or executes the program segment stored in the storage device 14 and recalls data stored in the storage device 14, and implements various functions of the electronic device 10. The storage device 14 may mainly include a storage program area and a storage data area, the storage program area may store an operating system, an application (such as image processing program) required for at least one function. The storage data area may store data created (such as image of face of each student and student name and screening rules).

The storage device 14 may include a RAM, and may also include non-volatile memory such as a hard disk, a memory, a plug-in hard disk, a smart memory card (SMC), and a Secure Digital (SD) card, a flash card, at least one disk storage device, flash device, or other volatile or non-volatile solid-state storage device.

Figure 2:
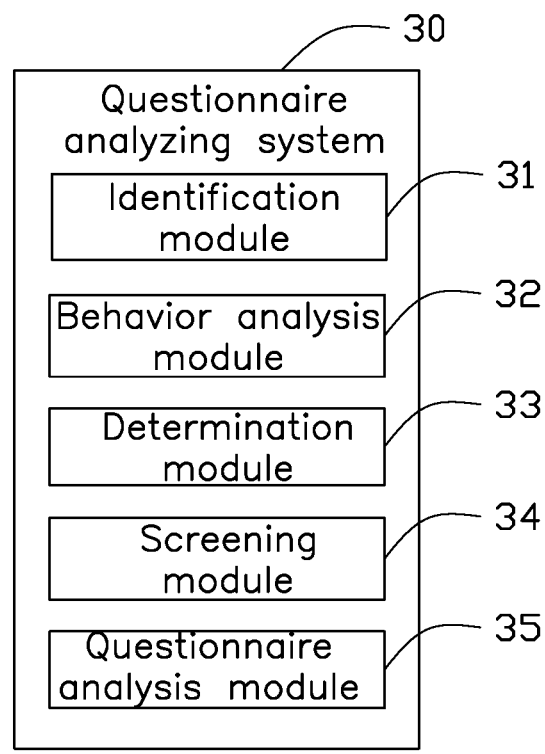
FIG. 2 is a block diagram of an embodiment of a system for analyzing responses to questionnaires.

FIG. 2 illustrates a questionnaires analyzing system 30 in accordance with an embodiment of the present disclosure. The questionnaires analyzing system 30 operates in the electronic device 10.

The teach questionnaire analysis system 30 may include functional modules consisting of program code. The functional modules can include an identification module 31, a behavior analysis module 32, a determination module 33, a screening module 34, and a questionnaire analysis module 35.

The modules 31-34 include computer instructions or codes in form of one or more programs that may be stored in the storage device 14, and which are executed by the at least one processor 12. In other embodiment, the modules 31-34 may also be a program instruction or firmware that is embedded in the processor 12.

The identification module 31 is configured to identify the identity of each student in the classroom image transmitted by the camera device 20. The identity includes, but is not limited to, the student's name and number. In one embodiment, the identification module 31 identifies the identity of each student in the classroom image according to a pre-stored face image of each student. In other embodiment, the identification module 31 identifies the identity of each student according to the name or student number in a database, or on a student uniform.

The behavior analysis module 32 analyzes the classroom image corresponding to each student in a preset time period, to obtain the classroom behavior of each student in the class. The classroom behavior may include behavior in a learning state and behavior in a non-learning state. Behaviors in the learning state include, but are not limited to, looking at the blackboard and taking own notes. Behaviors in the non-learning state include, but are not limited to, dozing, using mobile phones, and whispering with other students. The preset time period may be one month, one semester, or one academic year.

The determination module 33 is configured to determine whether the behavior of each student in the non-learning state meets a preset condition. In one embodiment, the preset condition may be that the number of non-learning behaviors is less than a preset value of the condition. The determination module 33 determines whether the number of times that each student shows non-learning behaviors is less or not less than the preset value.

In another embodiment, the preset condition may be that a duration of the behaviors in the non-learning state is less than a preset duration. The determination module 33 determines whether the duration of the behavior of each student in the non-learning state is less than the preset duration.

The screening module 34 is configured to apply a filter to the questionnaire responses given by each student according to the determination result and a screening rule. The screening rule determines whether the questionnaire responses are available or not available. When the behaviors of the student in the non-learning state meet (do not exceed) the preset conditions his responses to questionnaires are available, and when the behaviors of the student in the non-learning state do not meet (that is to say, exceed) the preset conditions, his responses to questionnaire are not available.

The questionnaire analysis module 35 is configured to perform a questionnaire analysis on the selected questionnaires after screening, to obtain a conclusion such as the quality of classroom teaching.

The modules and units integrated by the electronic device 10, if implemented in the form of software functional units and sold or used as separate products, may be stored in a computer readable storage medium. Based on such understanding, the present disclosure implements all or part of the processes in the foregoing embodiments, and the purposes of the disclosure may also be implemented and achieved by a computer program instructing related hardware. The computer program may be stored in a computer readable storage medium. The steps of the various method embodiments described above may be implemented by a computer program when executed by a processor. The computer program includes a computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), a random access memory (RAM), electrical carrier signals, telecommunications signals, and software distribution media.

Figure 3:
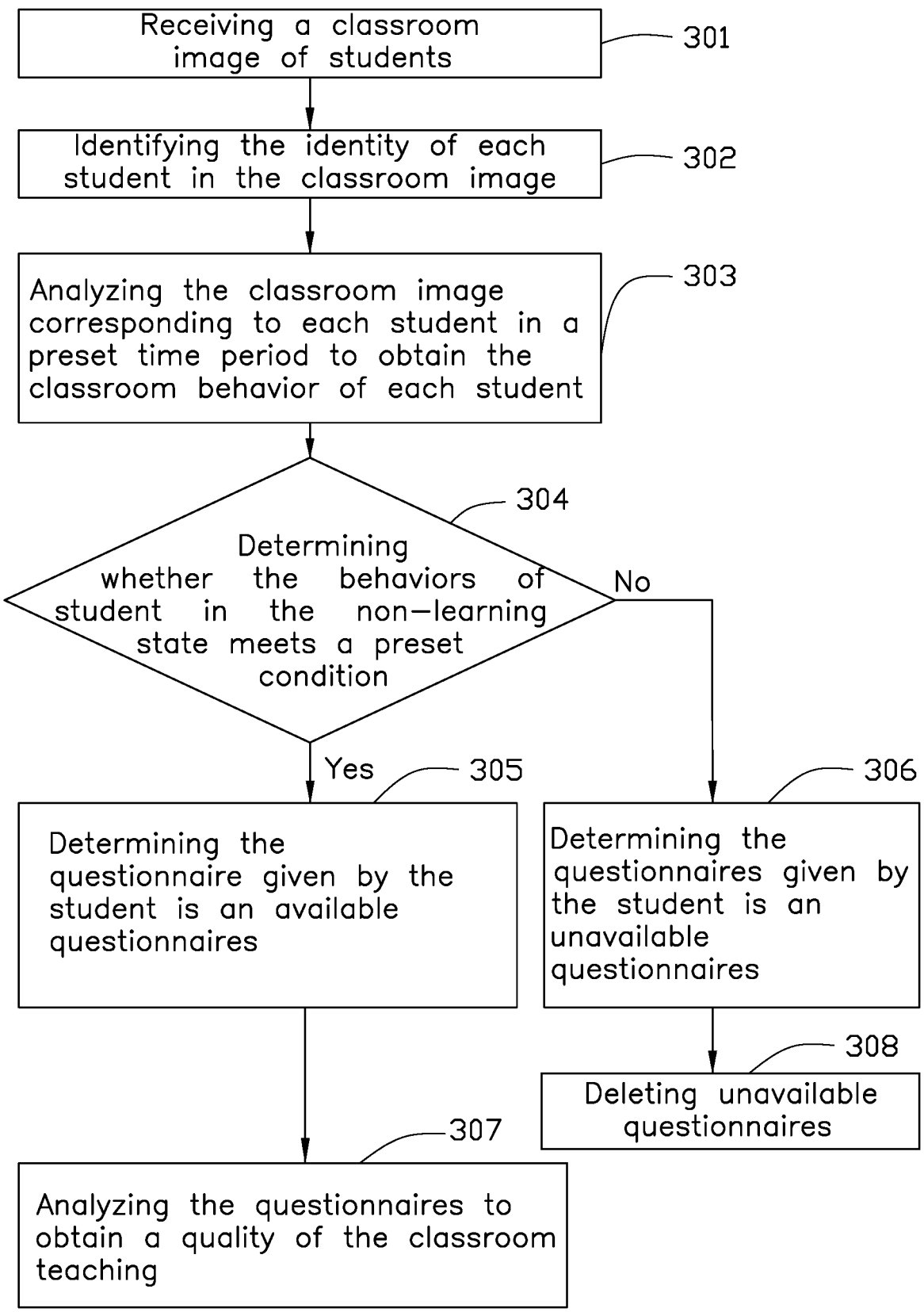
FIG. 3 is flowchart of an embodiment of a method for analyzing responses to questionnaires.

FIG. 3 is flowchart depicting an embodiment of a method for analyzing questionnaires. The method is provided by way of example, as there are a variety of ways to carry out the method. The method described below can be carried out using the configurations illustrated in FIGS. 1 and 2 for example, and various elements of these figures are referenced in explaining the example method. Each block shown in FIG. 3 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 31.

At block 301, the identification module 31 receives the classroom image of students. The classroom image may be from the camera device 20 or a relay device (not shown in figure).

At block 302, the identification module 31 identifies the identity of each student in the classroom image transmitted by the camera device 20.

In the embodiment, the identity includes, but is not limited to, the student's name and number. The identification module 31 identifies the identity of each student in the class image according to the pre-stored face image of each student. In other embodiment, the identification module 31 identifies each student according to the name or student number in a database, or on a student uniform.

At block 303, the behavior analysis module 32 analyzes the classroom image corresponding to each student in a preset time period, to obtain the classroom behavior of each student in the class.

In the embodiment, the classroom behavior may include behavior in a learning state and behavior in a non-learning state.

Behaviors in the learning state include, but are not limited to, looking at the blackboard, and taking own notes. Behaviors in the non-learning state include, but are not limited to, dozing, using mobile phones, and whispering with other students. The preset time period may be one month, one semester, or one academic year.

At block 304, the determination module 33 determines whether the behavior of each student in the non-learning state meets a preset condition. If the behavior of each student in the non-learning state meets a preset condition, block 305 is implemented, otherwise block 306 is implemented.

In one embodiment, the preset condition may be that the number of non-learning behaviors is less than a preset value of the condition. The determination module 33 determines whether the number of times that each student shows non-learning behaviors is less than the preset value at block 304. In one embodiment, the preset value may be 3, 4, or 5 times.

In another embodiment, the preset condition may be that a duration of the behavior in the non-learning state is less than a preset duration. The determination module 33 determines whether the duration of the behavior of each student in the non-learning state is less than the preset duration at block 304. The duration of the behavior in the non-learning state is proportional to the time of the behavior in the non-learning state, such as 0.9, 0.8, or 0.7.

At block 305, the screening module 34 determines the questionnaire responses are available.

At block 306, the screening module 34 determines the questionnaire responses are not available.

At block 307, the questionnaire analysis module 35 performs a questionnaire analysis on the selected questionnaires after screening, to obtain a conclusion such as the quality of classroom teaching.

At block 308, the questionnaire analysis module 35 deletes unavailable questionnaires.

In another embodiment, the questionnaires analyzing method may not include block 301, and the classroom image is stored in a local device.

In another embodiment, the questionnaires analyzing method may not include block 307, and the analysis of the teach questionnaires are completed by manually analyzing available questionnaires.

In another embodiment, the questionnaires analyzing method may not include block 308, and the unavailable questionnaires are not used as an analysis sample, but is reserved for later use.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for analyzing questionnaires given by students and operating in an electronic device, comprising:
   identifying an identity of each student in a classroom image;
   analyzing the classroom image corresponding to each student in a preset time period to obtain a classroom behavior of each student with the preset time period; wherein the classroom behavior comprises behaviors in a learning state and behaviors in a non-learning state; and
   determining whether the behaviors in the non-learning state meet a preset condition;
   determining the questionnaires given by the students are available questionnaires when the behaviors in the non-learning state meet the preset condition; and
   determining the questionnaires given by the students are unavailable questionnaires when the behaviors in the non-learning state do not meet the preset condition.

2. The method according to claim 1, further comprising: receiving the classroom image of students.

3. The method according to claim 1, further comprising: analyzing the available questionnaires to obtain a quality of classroom teaching.

4. The method according to claim 1, further comprising: deleting the unavailable questionnaires.

5. The method according to claim 1, wherein the preset time period is one academic year.

6. The method according to claim 1, further comprising: identifying the identity of each student in the classroom image according to a pre-stored face image of each student.

7. The method according to claim 1, wherein the preset condition is a number of times the behaviors in the non-learning state are less than a preset value.

8. The method according to claim 1, wherein the preset condition is that a duration of the behaviors in the non-learning state is less than a preset duration; wherein the duration of the behaviors in the non-learning state is proportional to a time of the behaviors in the non-learning state.

9. An electronic device, comprising:
   a storage device; and
   at least one processor, wherein the storage device stores one or more programs, when executed by the at least one processor, the one or more programs cause the at least one processor to:
   identify an identity of each student in a classroom image;
   analyze the classroom image corresponding to each student in a preset time period to obtain a classroom behavior of each student with the preset time period;
   wherein the classroom behavior comprises behaviors in a learning state and behaviors in a non-learning state; and
   determine whether the behaviors in the non-learning state meet a preset condition;
   determine questionnaires given by the students are available questionnaires when the behaviors in the non-learning state meet the preset condition; and
   determine the questionnaires given by the students are unavailable questionnaires when the behaviors in the non-learning state do not meet the preset condition.

10. The electronic device according to claim 9, wherein the at least one processor is further caused to:
    receive the classroom image of students.

11. The electronic device according to claim 9, wherein the at least one processor is further caused to:
    analyze the available questionnaires to obtain a quality of classroom teaching.

12. The electronic device according to claim 9, wherein the at least one processor is further caused to:
    deleting the unavailable questionnaires.

13. The electronic device according to claim 9, wherein the preset time period is one academic year; wherein the preset condition is a number of times the behaviors in the non-learning state are less than a preset value; and wherein the preset condition is that a duration of the behaviors in the non-learning state is less than a preset duration; wherein the duration of the behaviors in the non-learning state is proportional to a time of the behaviors in the non-learning state.

14. The electronic device according to claim 9, wherein the at least one processor is further caused to: identify the identity of each student in the classroom image according to a pre-stored face image of each student.

15. A non-transitory storage medium having stored thereon instructions that, when executed by a processor of an electronic device, causes the processor to perform an analyzing method, wherein the method comprises:
    identifying an identity of each student in a classroom image;
    analyzing the classroom image corresponding to each student in a preset time period to obtain a classroom behavior of each student with the preset time period;
    wherein the classroom behavior comprises behaviors in a learning state and behaviors in a non-learning state; and
    determining whether the behaviors in the non-learning state meet a preset condition;
    determining questionnaires given by the students are available questionnaires when the behaviors in the non-learning state meet the preset condition; and
    determining the questionnaires given by the students are unavailable questionnaires when the behaviors in the non-learning state do not meet the preset condition.

16. The non-transitory storage medium according to claim 15, further comprising:
    receiving the classroom image of students.

17. The non-transitory storage medium according to claim 15, further comprising:
    analyzing the available questionnaires to obtain a quality of classroom teaching.

18. The non-transitory storage medium according to claim 15, further comprising:
deleting unavailable questionnaires.

19. The non-transitory storage medium according to claim 15, further comprising:
identifying the identity of each student in the classroom image according to a pre-stored face image of each student.

20. The non-transitory storage medium according to claim 15, wherein the preset time period is one academic year; wherein the preset condition is a number of times the behaviors in the non-learning state are less than a preset value; and wherein the preset condition is that a duration of the behaviors in the non-learning state is less than a preset duration; wherein the duration of the behaviors in the non-learning state is proportional to a time of the behaviors in the non-learning state.

* * * * *